(12) United States Patent
Joseph et al.

(10) Patent No.: US 11,902,439 B2
(45) Date of Patent: Feb. 13, 2024

(54) COMPUTER-IMPLEMENTED SYSTEM AND METHOD FOR FAULT-RESISTANT MULTI-NODE COMMUNICATION

(71) Applicant: nChain Licensing AG, Zug (CH)

(72) Inventors: Daniel Joseph, London (GB); Craig Steven Wright, London (GB)

(73) Assignee: nChain Licensing AG, Zug (CH)

( * ) Notice: Subject to any disclaimer, the term of this patent is extended or adjusted under 35 U.S.C. 154(b) by 38 days.

(21) Appl. No.: 16/492,019

(22) PCT Filed: Mar. 2, 2018

(86) PCT No.: PCT/IB2018/051336
§ 371 (c)(1),
(2) Date: Sep. 6, 2019

(87) PCT Pub. No.: WO2018/163031
PCT Pub. Date: Sep. 13, 2018

(65) Prior Publication Data
US 2021/0135865 A1 May 6, 2021

(30) Foreign Application Priority Data
Mar. 6, 2017 (GB) .................................... 1703562

(51) Int. Cl.
*H04L 9/30* (2006.01)
*H04L 9/06* (2006.01)
(Continued)

(52) U.S. Cl.
CPC .............. *H04L 9/30* (2013.01); *H04L 9/0643* (2013.01); *H04L 9/0825* (2013.01);
(Continued)

(58) Field of Classification Search
CPC ....... H04L 9/30; H04L 9/0643; H04L 9/0825; H04L 63/0428
(Continued)

(56) References Cited

U.S. PATENT DOCUMENTS 7,233,664 B2 * 6/2007 Soliman .................... H04L 9/12
713/168
9,584,493 B1 2/2017 Leavy et al.
(Continued)

FOREIGN PATENT DOCUMENTS

CN 106296138 A 1/2017

OTHER PUBLICATIONS

"CoinShuffle: Practical Decentralized Coin Mixing for Bitcoin," MMCI Saarland University; Ruffing, Tim, Moreno—Sanchez, Pedro, Aniket, Kate. Springer International Publishing Switzerland. (Year: 2014).*

(Continued)

*Primary Examiner* — Dant B Shaifer Harriman
(74) *Attorney, Agent, or Firm* — Davis Wright Tremaine LLP (57) ABSTRACT

Techniques are presented relating to security of blockchain transactions that transfer digital assets or entities from one resource to another. Techniques provide a computer-implemented method for improving the security, anonymity and/or control of a value-mixing blockchain transaction having a plurality of participating nodes, each node having a respective output address to which the transaction is to allocate value. The method includes encrypting by a node its output address using that node's public key, adding the encrypted output address to a set of output addresses for the transaction, shuffling the order of the encrypted output addresses in the set. Each participating node identifies its encrypted output address in the set, and replaces its
(Continued)

encrypted output address with its unencrypted output address. The result is a shuffled set of output addresses that cannot be linked to a particular input. with its unencrypted output address. The result is a shuffled set of output addresses that cannot be linked to a particular input.

16 Claims, 5 Drawing Sheets

(51) Int. Cl.
 *H04L 9/08* (2006.01)
 *H04L 9/40* (2022.01)
 *H04L 9/00* (2022.01)
(52) U.S. Cl.
 CPC ............ *H04L 63/0428* (2013.01); *H04L 9/50* (2022.05); *H04L 2209/463* (2013.01)
(58) Field of Classification Search
 USPC ........................................................ 713/168
 See application file for complete search history.

(56) References Cited

U.S. PATENT DOCUMENTS

| | | | |
|---|---|---|---|
| 10,050,779 | B2 | 8/2018 | Alness et al. |
| 10,263,779 | B2* | 4/2019 | Wu .......................... H04L 9/32 |
| 2004/0179690 | A1* | 9/2004 | Soliman .................. H04L 9/083 380/277 |
| 2007/0274525 | A1* | 11/2007 | Takata .................. H04L 63/065 380/279 |
| 2009/0103734 | A1* | 4/2009 | Hammell ............ H04L 63/0464 380/278 |
| 2017/0032614 | A1* | 2/2017 | Fine .................... G07F 17/3227 |
| 2017/0046520 | A1* | 2/2017 | Ohrimenko ......... G06F 21/6218 |
| 2017/0180367 | A1* | 6/2017 | Warren ................ H04L 63/0823 |
| 2018/0337782 | A1* | 11/2018 | Wu ......................... H04L 63/06 |
| 2022/0085984 | A1* | 3/2022 | Khandani ............. H04L 9/0631 |

OTHER PUBLICATIONS

Chuckone et al., "Coin Shuffling," Nxt Forum, May 30, 2014, https://nxtforum.org/privacy/coin-shuffling/?PHPSESSID=2ou3hmga4v7a66gkdas0ok6d7, 6 pages.
Cloak, "Posa v3.0: A trustless, anonymous transaction system for CloakCoin," Brave New Coin, https://bravenewcoin.com/assets/Whitepapers/CloakCoin-posa3wp.pdf, Apr. 27, 2015, 16 pages.
Coutu, "Privacy in Bitcoin through decentralized mixers," Université de Montréal Department of Computer Science and Operations Research, Master of Sciences Thesis, Apr. 30, 2014, 118 pages.
International Search Report and Written Opinion dated Jun. 18, 2018, Patent Application No. PCT/IB2018/051336, 11 pages.
Nakamoto, "Bitcoin: A Peer-to-Peer Electronic Cash System," Bitcoin, Oct. 31, 2008, https://bitcoin.org/bitcoin.pdf, 9 pages.
UK Commercial Search Report dated Apr. 6, 2017, Patent Application No. GB1703562.7, 6 pages.
UK IPO Search Report dated Aug. 4, 2017, Patent Application No. GB1703562.7, 5 pages.
Van Wirdum, "ValueShuffle Brings Together the Best of Both Worlds for Privacy," Bitcoin Magazine, Jan. 4, 2017, https://bitcoinmagazine.com/culture/valueshuffle-brings-together-the-best-of-both-worlds-for-privacy-1483557170, 5 pages.
Ziegeldorf et al., "CoinParty: Secure Multi-Party Mixing of Bitcoins," Proceedings of the 5th ACM Conference on Data and Application Security and Privacy, Mar. 2, 2015, 12 pages.
Antonopoulos, "Mastering Bitcoin—Unlocking Digital Cryptocurrencies," O'Reilly Media, Inc., Dec. 20, 2014, 282 pages.
Satoshi et al., "Connection Limits," Bitcoin Forum, Aug. 9, 2010, https://bitcointalk.org/index.php?topic=741.0;prev_next=prev, 2 pages.
Nagata, K. et al., "A Study on a Method of Identity Verification in Blockchains," IPSJ SIG Technical Report, vol. 2017-DPS-170, No. 19, 2017, Information Processing Society of Japan, 12 pages.

\* cited by examiner

COMPUTER-IMPLEMENTED SYSTEM AND METHOD FOR FAULT-RESISTANT MULTI-NODE COMMUNICATION

This invention relates generally to cryptographic techniques for ensuring and controlling security in respect of computer-implemented processes. These cryptographic techniques can provide enhanced security and control in respect of blockchain transactions which transfer digital assets or entities from one resource to another. More particularly, the invention can be used to advantage to provide control methods, systems and devices to generate and carry out a mixing transaction that decouples inputs from outputs.

In this document we use the term 'blockchain' to include all forms of electronic, computer-based, distributed ledger technologies. (DLTs) These include, but are not limited to consensus-based blockchain and transaction-chain technologies, permissioned and un-permissioned ledgers, shared ledgers, side chains and variations thereof. The most widely known application of blockchain technology is the Bitcoin ledger, although other blockchain implementations have been proposed and developed. While Bitcoin may be referred to herein for the purpose of convenience and illustration, it should be noted that the invention is not limited to use with the Bitcoin blockchain and alternative blockchain implementations and protocols fall within the scope of the present invention.

A blockchain is a consensus-based, electronic ledger which is implemented as a computer-based decentralised, distributed system made up of blocks which in turn are made up of transactions. Each transaction is a data structure that encodes the transfer of control of a digital asset between participants in the blockchain system, and includes at least one input and at least one output. Each block contains a hash of the previous block so that blocks become chained together to create a permanent, unalterable record of all transactions which have been written to the blockchain since its inception. Transactions contain small programs known as scripts embedded into their inputs and outputs, which specify how and by whom the outputs of the transactions can be accessed. On the Bitcoin platform, these scripts are written using a stack-based scripting language.

In order for a transaction to be written to the blockchain, it must be "validated". Network nodes (miners) perform work to ensure that each transaction is valid, with invalid transactions rejected from the network. Software clients installed on the nodes perform this validation work on an unspent transaction (UTXO) by executing its locking and unlocking scripts. If execution of the locking and unlocking scripts evaluate to TRUE, the transaction is valid and the transaction is written to the blockchain. Thus, in order for a transaction to be written to the blockchain, it must be i) validated by the first node that receives the transaction—if the transaction is validated, the node relays it to the other nodes in the network; and ii) added to a new block built by a miner; and iii) mined, i.e. added to the public ledger of past transactions.

Although blockchain technology is most widely known for the use of cryptocurrency implementation, digital entrepreneurs have begun exploring the use of both the cryptographic security system Bitcoin is based on and the data that can be stored on the Blockchain to implement new systems. It would be highly advantageous if the blockchain could be used for automated tasks and processes which are not limited to the realm of cryptocurrency. Such solutions would be able to harness the benefits of the blockchain (e.g. a permanent, tamper proof records of events, distributed processing etc) while being more versatile in their applications.

Another area of blockchain-related interest is the use of 'tokens' (or 'coloured coins') to represent and transfer real-world entities via the blockchain. A potentially sensitive or secret item can be represented by the token which has no discernable meaning or value. The token thus serves as an identifier that allows the real-world item to be referenced from the blockchain. The term "token" as used herein is to be understood in its broadest sense as representing control or ownership of a tangible or intangible asset. In some cases, tokens may represent assignment of control or ownership of future computing resources, for example.

One of the perceived advantages of blockchain technology, such as Bitcoin, is its anonymity. That is, the Bitcoin ledger does not contain any personal information about those participating in transactions; it only contains public address information. However, using external data and analytics it is possible to successfully associate specific transactions and addresses with an individual.

In order to improve anonymity and fungibility of the Bitcoin currency, coin mixing transactions may be used. A coin mixing transaction, like CoinJoin, pools a set of inputs and transfers value to a set of outputs. However, CoinJoin still involves at least one participant that has knowledge of the input-output relationship of another participant, making it only partly anonymous.

A transaction titled CoinShuffle was created to improve the anonymity of the CoinJoin transaction. In the CoinShuffle transaction, a node encrypts its output address using the public keys of all subsequent participants in a sequence associated with the transaction, and the output addresses are shuffled before being passed to the next node. The end result is that none of the participants know the input-output link for any other participant in the transaction. However, a drawback of the CoinShuffle transaction is that all participants and their sequence of participation must be known in advance and strictly observed. This result in potential failures if a participant is to drop out part-way through the transaction, and prevents any new nodes from joining a transaction that is not yet completed. It also results in significant delay if one of the nodes is offline when its actions are required by the sequence.

Thus, it is desirable to provide for improved methods and devices that enable multi-node communication, such as blockchain mixing transactions, while providing greater flexibility in adding new nodes and/or modifying a sequence of participation of nodes to enable greater flexibility and fault-tolerance.

Such an improved solution has now been devised.

Thus, in accordance with the present invention there are provided methods, systems and devices as defined in the appended claims.

The present application discloses methods and devices for fault-resistant multi-node communications. There may be provided methods, systems and devices that provide improved cryptographic techniques and solutions for controlling the transfer of value or digital asset via a blockchain. The invention may enable enhanced security and/or anonymity in a value or coin mixing blockchain transaction, through providing for an improved fault-resistant multi-node communication. Additionally or alternatively, the methods and devices may provide greater flexibility in adding or removing participants from the transaction while it is being built amongst the nodes. Thus, in at least one implementation, the invention may provide an enhanced control solution in respect of blockchain transactions (Txs) which transfer ownership of digital assets from one party to another.

The present application may provide a computer-implemented method of fault-resistant multi-node communication, the communication having a plurality of participating nodes, each node having its own public key and private key, each node having a respective output address to which the communication is to assign tokens. In one example, the present application may comprise a computer-implemented method to enable participation in a blockchain transaction, the transaction having a plurality of participating nodes. Each node may have its own (cryptographic) public key and private key. Each node may have a respective output address to which the transaction is to allocate or transfer value. The method may be implemented at one of the participating nodes. It may include encrypting a first output address associated with said one of the participating nodes using a first public key associated with said one of the participating nodes; adding the encrypted first output address to a set of encrypted output addresses; shuffling the order of the encrypted output addresses in the set; and sending the set to a next node. The method may further include receiving a further shuffled set of addresses from another of the participating nodes, the further shuffled set of addresses including the encrypted first output address; replacing the encrypted first output address in the further shuffled set of addresses with a first output address; and forwarding the further shuffled set of addresses containing the first output address to a subsequent node.

In some implementations, replacing the encrypted first output address in the further shuffled set of addresses with the first output address includes (a) encrypting the first output address with a originator's public key to obtain a final encrypted first output address, and the second public key being associated with an originator node; and (b) replacing the encrypted first output address with the final encrypted first output address. In some other implementations, replacing includes replacing the encrypted first output address with an unencrypted first output address.

In some implementations, the present application describes a subsequent operation of approving the blockchain transaction by signing an input address included in the blockchain transaction and associated with said one of the participating nodes.

In some implementations, the present application provides that adding the encrypted first output address further involves first receiving an encrypted set from a prior participating node and decrypting the encrypted set to obtain the set of encrypted output addresses. In some implementations, sending the set to a next node includes encrypting the set using a second public key associated with the next node. Encrypting the set using the second public key may exclude encrypting the set with further public keys associated with other participating nodes.

In some implementations, the present application provides that sending the set to a next node includes determining that the one of the participating nodes is not a last node in a first sequence of the participating nodes, and sending the set to the next node in the first sequence.

In some implementations, the present application provides that sending the set to a next node includes determining that the one of the participating nodes is a last node in a first sequence of the participating nodes, and sending the set to a first node in the first sequence, and wherein the first node is an originator of the blockchain transaction.

In some implementations, the present application provides that forwarding the further shuffled set of addresses to the subsequent node includes determining that the one of the participating nodes is not a final node in a second sequence of the participating nodes, and sending the set to the subsequent node in the second sequence.

In some implementations, the present application provides that forwarding the further shuffled set of addresses to the subsequent node includes determining that the one of the participating nodes is a final node in a second sequence of the participating nodes, and sending the set to a first node in the second sequence The first node is an originator of the blockchain transaction, and the further shuffled set contains all output addresses for the blockchain transaction. In some cases, each of output addresses in the further shuffled set has been encrypted using the originator node's public key.

In some implementations, the present application provides that shuffling the order includes randomizing the order of the encrypted output addresses in the set.

In some implementations, the present application provides that the method may include first sending a request to participate in the blockchain transaction, the request including the first public key.

In some implementations, each of the respective output addresses is an unspent transaction output address owned by its associated participating node.

In some implementations, the value is a currency amount, and the blockchain transaction is structured to receive an equal currency amount from a respective input address associated with each participating node and to allocate the same equal currency amount to each of the respective output addresses.

The present application may comprise a computer-implemented method which provides improved cryptographic techniques and solutions for controlling the transfer of value or digital asset via a blockchain. The invention may provide enhanced security and/or improving the anonymity of a value mixing blockchain transaction having a plurality of participating nodes, each node having a respective output address to which the transaction is to allocate value. The method may include the step wherein, each participating node, in a first sequence, encrypting its output address using that node's public key, adding the encrypted output address to a set of output addresses for the transaction, and if there is more than one encrypted output address in the set, shuffling the order of the encrypted output addresses in the set. Each participating node, in a second sequence, may identify its encrypted output address in the set, and replace its encrypted output address with its unencrypted output address. The result may be a shuffled set of output addresses that cannot be linked to a particular input.

Any feature described above in relation to one aspect or embodiments may be used in combination with any other aspect or embodiment. For each embodiment of the method there is provided a corresponding system arranged to implement that method. Any feature described in relation to an embodiment of the method may also be applicable to the corresponding system, and vice versa.

Implementations of the present invention provide for improved fault-resistant multi-node communications, which in some cases may be used for allocating tokens among participating nodes in accordance with a mixing protocol. Through the described operations of the present invention, the communication is less prone to delay and failure due to an offline or missing node, due to a change in the participating nodes, and/or due to a re-ordering of the participating nodes.

These and other aspects of the present invention will be apparent from and elucidated with reference to, the embodiment described herein. An embodiment of the present invention will now be described, by way of example only, and with reference to the accompanying drawings, in which:

FIG. 5 shows a block diagram of a simplified participating node. In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Many of the example embodiments described below may make reference to a blockchain transaction; however, it will be appreciated that the present invention is not limited to implementation in connection with a blockchain. Moreover, references below to coins or value do not limit the scope of the present application to cryptocurrency applications. The present application may involve more general distribution or allocation of tokens among nodes, whether using a blockchain or not.

Figure 1:
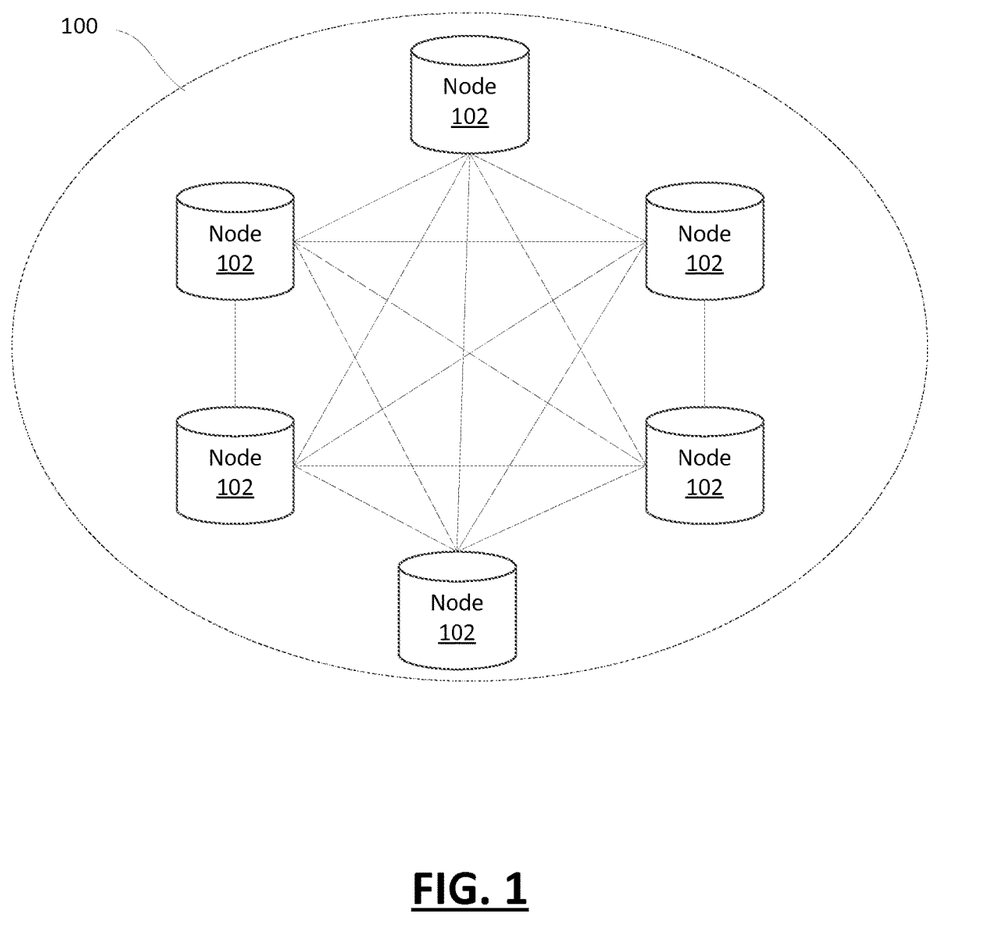
FIG. 1 illustrates an example blockchain network of nodes.

Reference will first be made to FIG. 1 which illustrates, in block diagram form, an example blockchain network 100 associated with a blockchain. The blockchain network is a peer-to-peer open membership network which may be joined by anyone, without invitation or without consent from other members. Distributed electronic devices running an instance of the blockchain protocol under which the blockchain network 100 operates may participate in the blockchain network 100. Such distributed electronic devices may be referred to as nodes 102. The blockchain protocol may be a Bitcoin protocol, or other cryptocurrency, for example.

The electronic devices that run the blockchain protocol and that form the nodes 102 of the blockchain network 100 may be of various types including, for example, computers such as desktop computers, laptop computers, tablet computers, servers, mobile devices such a smartphones, wearable computers such as smart watches or other electronic devices.

Nodes 102 of the blockchain network 100 are coupled to one another using suitable communication technologies which may include wired and wireless communication technologies. In many cases, the blockchain network 100 is implemented at least partly over the Internet, and some of the individual nodes 102 may be located in geographically dispersed locations.

Nodes 102 maintain a global ledger of all transactions on the blockchain. The global ledger is a distributed ledger and each node 102 may store a complete copy or a partial copy of the global ledger. Transactions by a node 102 affecting the global ledger are verified by other nodes 102 so that the validity of the global ledger is maintained. The details of implementing and operating a blockchain network, such as one using the Bitcoin protocol, will be appreciated by those ordinarily skilled in the art.

Each transaction typically has one or more inputs and one or more outputs. Scripts embedded into the inputs and outputs specify how and by whom the outputs of the transactions can be accessed. The output of a transaction may be an address to which value is transferred as a result of the transaction. That value is then associated with that output address as an unspent transaction output. A subsequent transaction may then reference that address as an input in order to spend or disperse that value.

While the transactions are pseudo-anonymous in that no personal information in contained in the transactions on the blockchain ledger, it is possible to trace the transfer of value in chains of transactions and, in some cases, to link value to an individual using external data. In order to increase anonymity, a coin mixing transaction may be used to pool inputs from a variety of sources and then to divide and allocate the pooled value to outputs. If all the inputs and outputs are the same size, it is difficult to associate a particular input with a particular output. However, in such transactions at least one participating node is aware of the linkage between an input address and output address specified by another participating node.

Some attempts, like CoinShuffle in the Bitcoin protocol, have been made to further anonymize coin mixing. However the CoinShuffle protocol requires complete knowledge of the participants at the outset and execution of the operations in a defined order without deviation.

In accordance with the present application a method and device are described that facilitate value mixing with greater flexibility in participation and completion, thereby improving reliability, likelihood of completion, and speed of completion. In general, the described method involves building a set of shuffled encrypted output addresses, wherein each node in turn adds its associated encrypted output address to the set and then shuffles the order of the encrypted addresses in the set until a complete set is developed. Then the nodes again circulate the set and each node, in turn, replaces its respective encrypted address with its unencrypted output address. Once each participating node has replaced its encrypted output address with its unencrypted output address, the set of output addresses for the transaction is complete and none of the nodes can determine which of the other nodes added any of the other output addresses.

In the description herein, the terms "participating node" and its "output address" may be used. The reference to an "output address" of the participating node is not meant to refer to a network address of a physical node. Instead the "output address" is an address specified in a transaction on the blockchain having an unspent value to which the physical node can claim ownership by having a key that corresponds to a signature on the transaction. In this sense, the "output address" is not an address of the participating node, but is a blockchain transaction output address that is owned by or associated with the participating node. Any references to the "output address" of a participating node herein should be understood as such.

Figure 2:
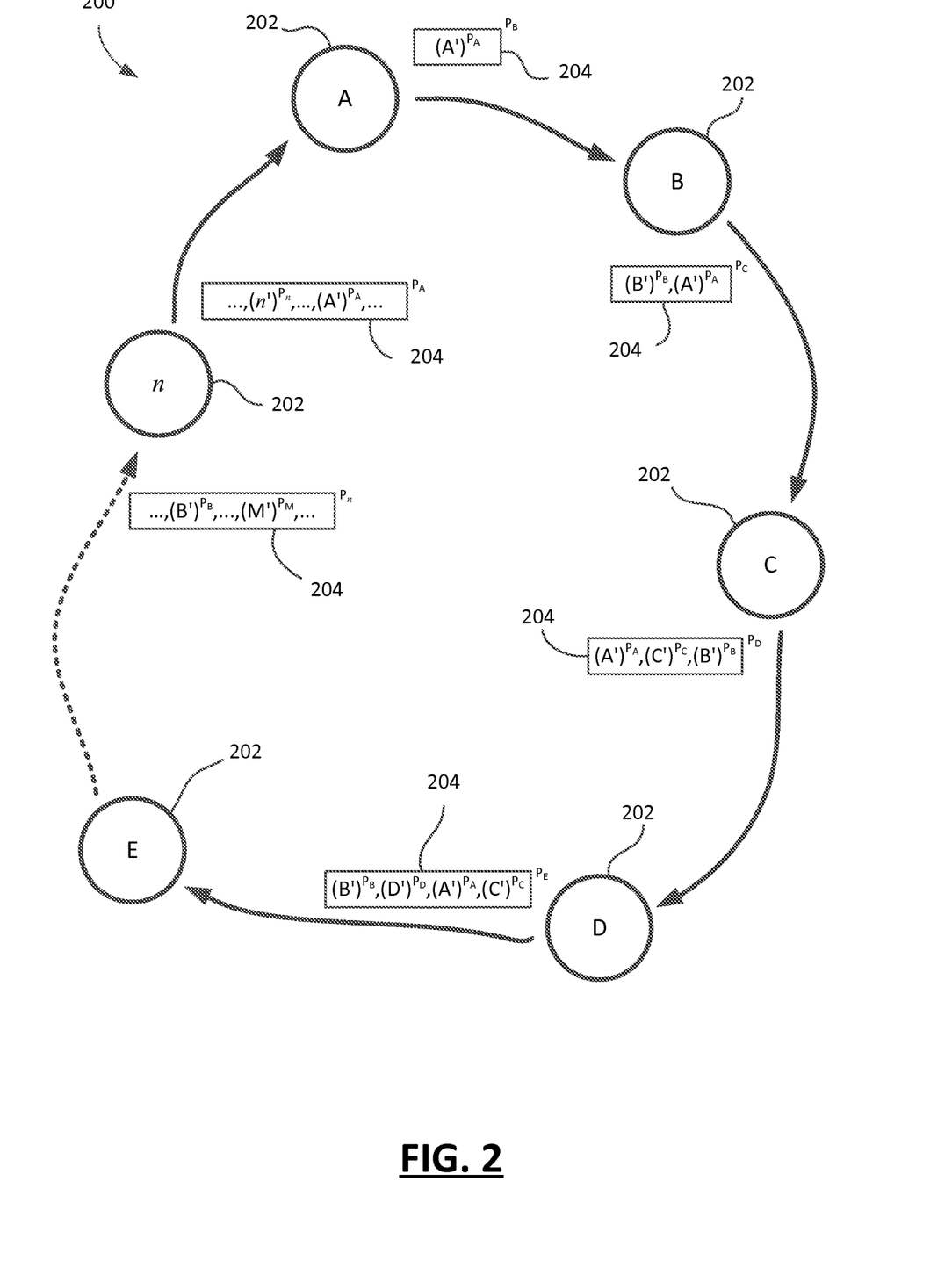
FIG. 2 diagrammatically illustrates a first stage in generating and carrying out a value mixing blockchain transaction.

Reference is now made to FIG. 2, which diagrammatically illustrates a first stage 200 in a blockchain transaction in accordance with the present application. The transaction may have n participants (referred to herein as "nodes" or "participating nodes"). Individual nodes 202 are labelled as "A", "B", "C", . . . "n" for ease of illustration and discussion.

Although the nodes 202 are illustrated as communicating in a circle, the physical arrangement and geographic arrangement of the nodes 202 and their interconnectivity in the network may take any form.

One of the nodes 202, in this case node A, originates the operation by proposing the blockchain transaction. The proposed transaction may be publicized using any publication, notice or other such function prescribed by the applicable protocol for initiating mixing transactions and soliciting participation.

A participating node 202 that wishes to join the transaction may notify the originating node, like node A, which may maintain a list of participating nodes and the order in which they are to carry out the first stage. In some instances, if the first stage is already underway, node A may forward information about the new participant to the last node in the order, so that the last node can correctly forward the set of addresses to the new participant. In some cases, depending on the underlying blockchain protocol, control may be more decentralized with participants joining the transaction without necessarily notifying the originator. A published list of participating nodes in the transaction may be available on a decentralized basis, and a new participant may contact the last participating node on the list to indicate its intention to join the transaction. Other mechanisms for joining the transaction may be used depending on the underlying blockchain protocol.

Each node 202 has its own public-private key pair. For example node A has the public key $P_A$ and the private key $V_A$. Each node 202 in the transaction shares its public key with at least the node 202 prior to it in the order or sequence.

The first stage of building the transaction involves node A, the originator (may also be termed the "initiator"), encrypting its associated output address, denoted A', with its public key $P_A$. As explained above, the "output address" is a blockchain unspent value output address that is owned by the participating node, and not a network address for the participating node. The encrypted output address associated with node A is the first element of a set 204 of output addresses. Node A then encrypts the set 204 with the public key $P_B$ of node B, the next node in the sequence. The encrypted set 204 is then provided to node B, which decrypts the set 204. For the purposes of illustration, FIG. 2 shows public key $P_i$ in superscript to indicate it was used in encrypting a given element or the set 204, as the case may be.

Node B encrypts its associated output address, denoted B', with its public key $P_B$ and adds it to the set 204. It shuffles the order of the addresses in the set using any suitable pseudorandom process. The set 204, containing the shuffled encrypted output addresses associated with nodes A and B, is then encrypted with the public key $P_C$ of the nest node in the sequence, node C.

This process continues, with each node in turn decrypting the set 204, encrypting its associated output address, adding it to the set and shuffling the order of the addresses in the set, and then encrypting and forwarding the encrypted set to the next node in the sequence, until a stopping condition is reached. In one example, the stopping condition may include reaching a prescribed minimum number of participating nodes, e.g. n nodes. In another example, the stopping condition may include a time restriction, e.g. stop the first stage after X number of minutes. In yet another example, the stopping condition may include both a minimum number of participating nodes and an expiry time, such that if the minimum number of nodes is not reached within the expiry time, then the transaction is cancelled, and provided at least the minimum number of participating nodes have joined at the expiry time then the transaction proceeds.

Once the $n^{th}$ node has added its encrypted output address and shuffled the order of the addresses, it then encrypts the set 204 with the public key $P_A$ for the originator, node A, and provides the encrypted set to node A. At the end of the first stage, node A has a set containing all of the output addresses being specified by each of the participating nodes, each output address being encrypted using the public key of the node that added it. The order of the addresses in the set is randomized so that it is unrelated to the order of any inputs specified for the transaction.

The order or sequence in which nodes participate need not be determined in advance and may change as the first stage 200 proceeds. That is, for example, node E may decide to join the transaction after nodes A, B and C have already added their addresses to the set 204, and node D, having received notice of node E's participation and a copy of node E's public key $P_E$, will forward the encrypted set to node E in turn. Also, a node that had previously indicated it would participate may drop out of the transaction prior to contributing its encrypted address. Furthermore, the order may change if one of the nodes is unavailable because it is temporarily offline or unresponsive. As an example, if node E is offline, node D may encrypt the set 204 with the public key $P_F$ of another participating node, like node F, and may forward the set to node F, thereby skipping node E. Node E may end up not participating in the transaction, or may come back online in time to participate in the transaction later in the sequence.

Figure 3:
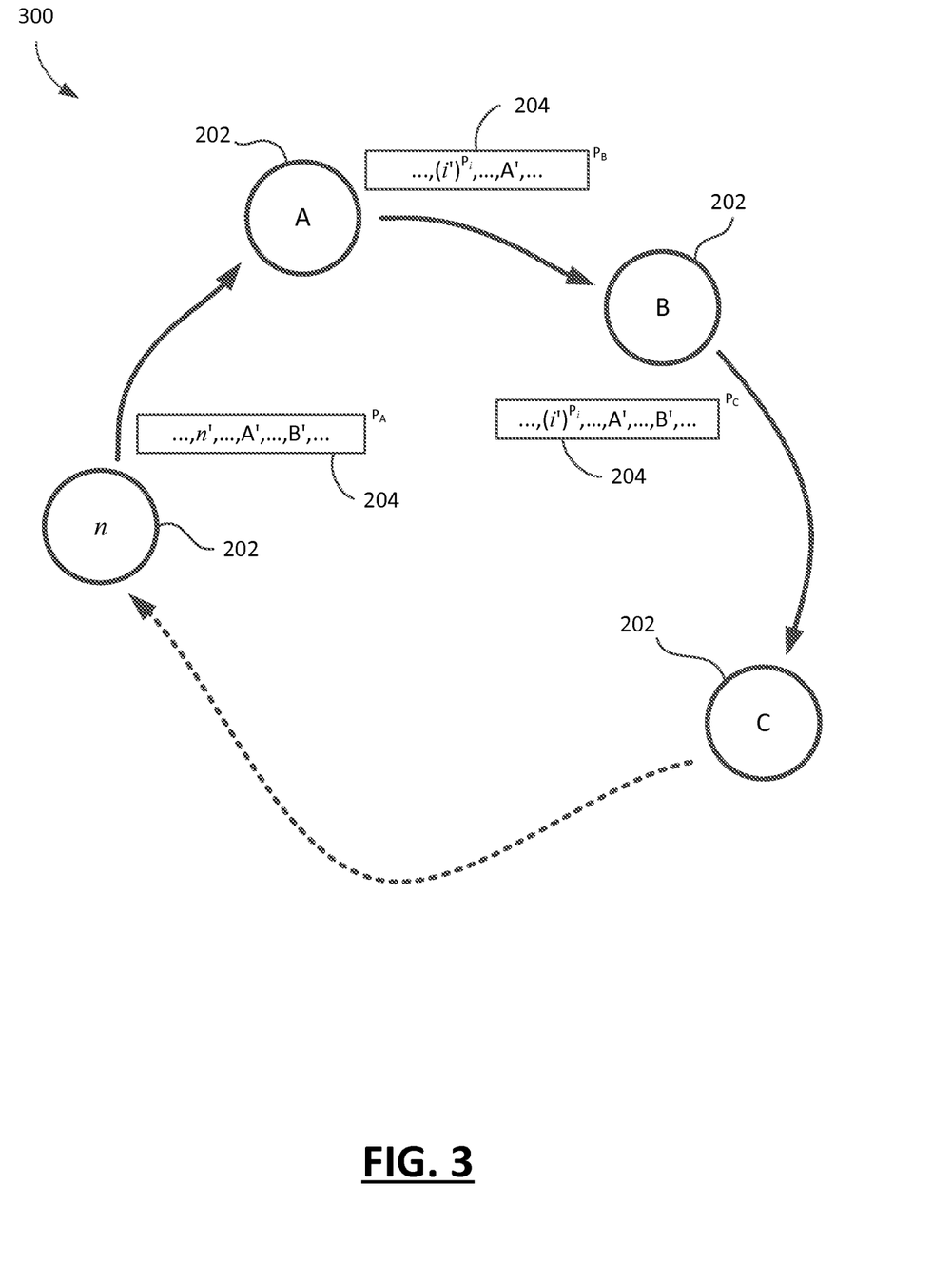
FIG. 3 diagrammatically illustrates a second stage in generating and carrying out the value mixing blockchain transaction.

References is now made to FIG. 3, which diagrammatically illustrates a second stage 300 in the blockchain transaction in accordance with the present application. The second stage 300, which may be called the decryption stage, involves each participating node 202 replacing its encrypted output address with the unencrypted output address. For example, node A decrypts the set 204 of addresses. It then searches the set and identifies the encrypted output address that node A inserted in the set. It may do so by attempting to decrypt each encrypted address in the set to identify its own output address. A faster approach may be to store a copy of the encrypted output address during the first stage 200 and simply search the set 204 for a matching encrypted output address during the second stage 300.

Having replaced its encrypted output address with its unencrypted output address in the set 204, node A then encrypts the set with the public key of the next node in the sequence (in this example, node B) and provides the encrypted set to node B.

Node B then performs the same operations of decrypting the set 204, identifying its encrypted output address, replacing it with its unencrypted output address, encrypting the set with the public key of the next node, and passing the encrypted set along. This process continues from node to node until all nodes participating in the transaction have replaced their encrypted output address with their unencrypted output address. The set then contains a full list of output addresses for the blockchain transaction in a randomized order.

Note that the sequence or order of the nodes in the second stage 300 does not need to be the same as in the first stage 200.

It may be appreciated that the described decryption process still leaves open the possibility that at least one participant will be able to identify the output address of another participant. In particular, node n-2 receives a set containing all the unencrypted addresses and the encrypted output address for itself (which it can identify) and the encrypted address for node n. At that stage it cannot determine which addresses are encrypted and which are unencrypted; however, once the transaction is complete, it will be able to identify which of the addresses has changed as a result of node n replacing its encrypted address with its unencrypted address, and thus, which output address is associated with node n.

To further enhance anonymity, in some implementations, the decryption process involves each node encrypting its output address with the public key of node A. That is, instead of replacing its encrypted output address with its unencrypted output address thereby leaving it exposed for all subsequent nodes in the process to see, it encrypts its output address using node A's public key and inserts that encrypted version of its output address in place of the earlier encrypted output address that it first inserted. After all nodes have replaced their addresses and returned the set to node A, node A may then decrypt all the addresses to obtain the set of unencrypted shuffled output addresses, and none of the nodes is able to identify which output address is associated with any other of the nodes.

In one variation, rather than inserting an encrypted output address during the first stage, each node inserts a pseudorandom string having a prescribed length. It stores that string in local memory so that it may identify it again, and then, in the second stage, the node replaces the string with its output address.

Once the full set of output address has been generated, the transaction is then presented to all participants for approval. Each participant signs their respective input to confirm participation in the transaction, which is then submitted to the blockchain network for validation and eventual inclusion in the blockchain.

Figure 4:
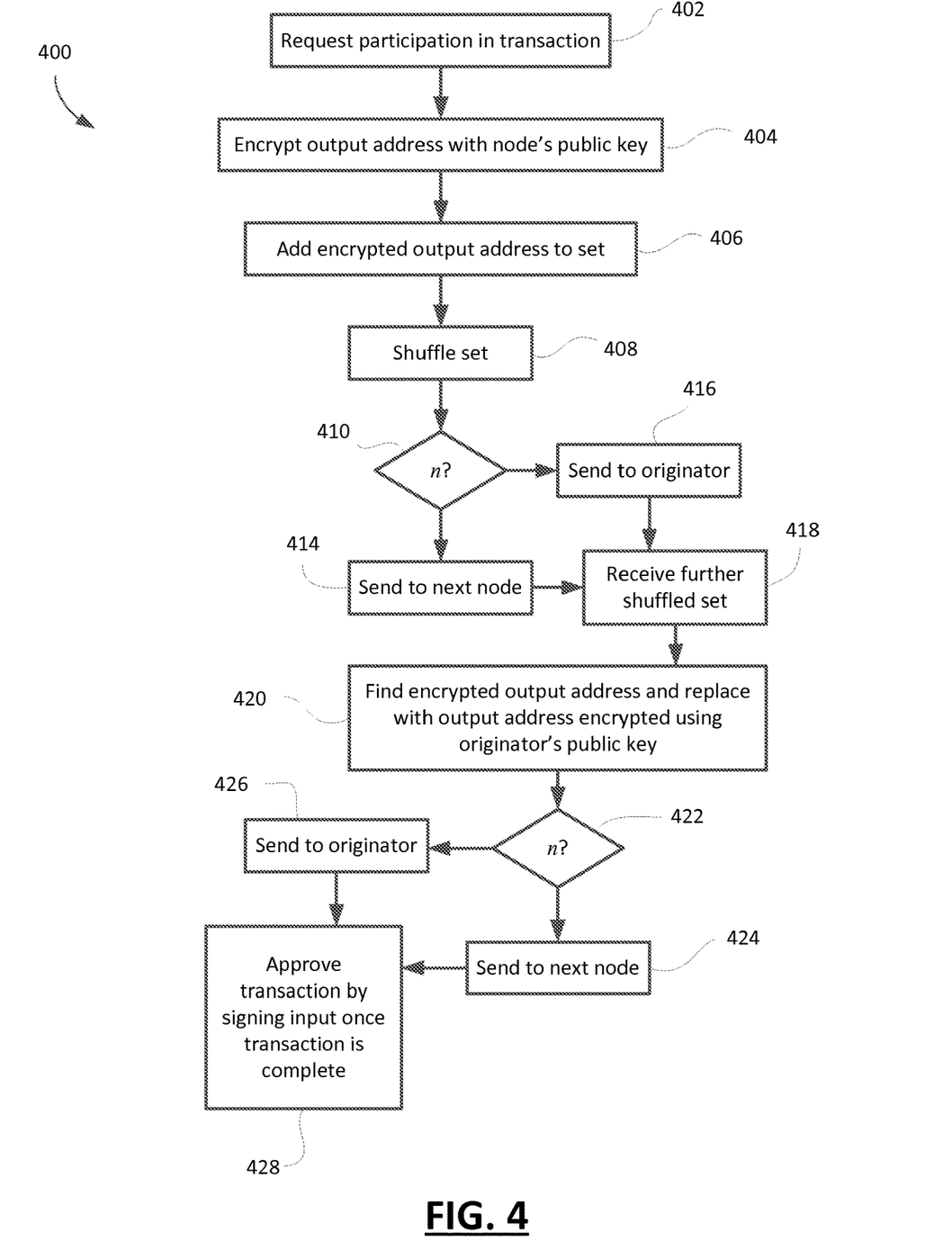
FIG. 4 shows, in flowchart form, an example process for participating in a value mixing blockchain transaction.

Reference will now be made to FIG. 4, which shows, in flowchart form, an example process 400 for generating a value mixing blockchain transaction. The example process 400 is a computer-implemented process carried out by one or more processors at one of the participating nodes in the blockchain transaction. This example presumes that the node is not the originator node.

The node requests participation in the transaction in operation 402. This may include making available the node's public key. In some implementations, the public key may be included in a request-to-join message generated and sent or published by the node. The message may be sent to the originator node, to the node that is the current holder of the set during the first stage, to both, or to another node acting as a central resource for identifying nodes participating in the transaction, depending on the implementation.

In operation 404, the node encrypts its output address (the address to which value is to be sent in the value mixing transaction). It may store a local copy of the encrypted output address so as to be able to easily identify it later in the shuffled set.

Once the node receives the set from the previous node in a first stage sequence, it decrypts the set. The set will have been encrypted by the previous node using the current node's public key. The current node, as holder of the corresponding private key, is able to decrypt the set. Then, in operation 406, it adds its encrypted output address to the set of encrypted output addresses and, in operation 408, shuffles the order of the encrypted output addresses within the set. The shuffling may employ any suitable pseudorandom process to rearrange the order of the encrypted output addresses.

The node then determines whether it is the last node in the sequence, i.e. whether it is the $n^{th}$ node, in operation 410. As noted above, in some implementations, n may be a prescribed minimum number of nodes set by the originator node, by external policy, or in some other manner, that once reached results in the end of the first stage of building the transaction. In other implementations, n may not be prescribed and may be the number of participating nodes that happen to have joined the transaction once an expiry time has been reached since initiating the transaction. A minimum number of participants may be required for the transaction to proceed, since too few participating nodes will reduce the anonymity provided by the value mixing transaction. In some implementations the minimum number n may be 50, although other minimums may be prescribed in other implementations.

If the node determines in operation 410 that it is not the last node in the sequence, then it sends the set to the next node in the sequence, as indicated by operation 414. Before sending the set it may encrypt the set using the public key $P_i$ of the next node i.

Although in some implementations, the set of encrypted output addresses may be passed from node to node without encrypting the set, the anonymity is improved by ensuring that the set is encrypted with the public key of the node to which it is being passed. Otherwise, any device able to observe the set going to and leaving a particular node may identify the encrypted output address string added by that particular node and, subsequently, identify the unencrypted output address added to the set in place of the encrypted output address. Accordingly, to improve security, the set itself is encrypted in this example.

If the node determines in operation 410 that it is the last node in the sequence, then it forwards the set to the originating node in operation 416. This may include first encrypting the set with the public key $P_A$ of the originating node.

In either case, the current node has added its encrypted output address, shuffled the order of encrypted addresses in the set, and passed the set to another participating node. It next receives the set during the second stage, as indicated by operation 418. The further shuffled set is received in operation 418. This set may or may not be encrypted with the current node's public key. It may or may not have been received from the same previous node since the sequence of nodes in the second stage is not necessarily the same as the sequence during the first stage.

In operation 420, the current node finds its encrypted output address within the further shuffled set and replaces it. In this example, the current node encrypts its output address using the public key of the originator node (node A), and replaces its encrypted output address in the shuffled set with this second encrypted output address. In this manner, only the originator node is able to decrypt the output address to expose it in unencrypted form once the transaction is ready to be assembled and approved. However, in some implementations, the current node may replace its encrypted output address with its output address in unencrypted form. For the reasons outlined above, such an implementation results in slightly less secure anonymity among the participating nodes.

The current node then again determines whether it is the last node in the second stage sequence of nodes, i.e. the $n^{th}$ node, as shown by operation 422. If not, then in operation 424 it passes the further shuffled set to the next node in the sequence. If it is the final node in the sequence, then the current node returns the further shuffled set, which would now contain all the output addresses, each encrypted using the originating node's public key, to the originating node, as indicated by operation 426.

Once all nodes have inserted their respective output addresses encrypted by the originator's public key, the originator node then decrypts the output addresses and publishes or otherwise makes available the transaction to the participating nodes, including its inputs and outputs and the value to be transferred from and to each address. In operation 428, the current node approves the transaction by signing its input. Once all nodes have signed-off on the transaction, it is submitted for validation to the blockchain network and, eventually, added to the blockchain.

It will be appreciated that some of the described operations in the above example embodiment may occur contemporaneously or in a different order in some implementations without materially impacting the process. The present application encompasses those variations and modifications.

Figure 5:
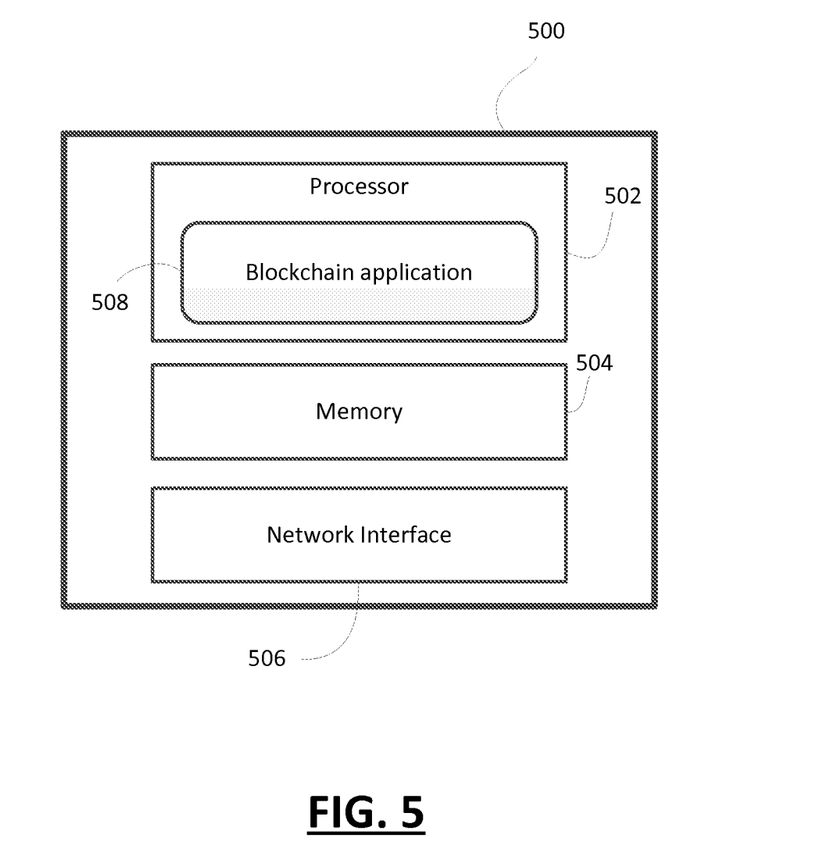

Reference will now be made to FIG. 5, which shows, in block diagram form, a simplified example of a participating node 500. The node 500 includes a processor 502, which may include one or more microprocessors, application specific integrated chips (ASICs), microcontrollers, or similar computer processing devices. The node 500 further includes memory 504, which may include persistent and non-persistent memory, to store values, variables, and in some instances processor-executable program instructions, and a network interface 506 to provide network connectivity over wired or wireless networks.

The node 500 includes a processor-executable blockchain application 508 containing processor-executable instructions that, when executed, cause the processor 502 to carry out one or more of the functions or operations described herein.

It will be understood that the devices and processes described herein and any module, routine, process, thread, application, or other software component implementing the described method/process for configuring the video feature extractor may be realized using standard computer programming techniques and languages. The present application is not limited to particular processors, computer languages, computer programming conventions, data structures, other such implementation details.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. In the present specification, "comprises" means "includes or consists of" and "comprising" means "including or consisting of". The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A computer-implemented method of fault-resistant multi-node communication, the communication having a plurality of participating nodes, each node having its own public key and private key forming a public-private key pair, each node having a respective output address to which the communication is to assign tokens, the method comprising:
   encrypting, by a node of the plurality of participating nodes, a first output address using a first public key to obtain an encrypted first output address, the first output address being the respective output address of the node, the first public key being the public key of the node;
   adding the encrypted first output address to a set of encrypted output addresses;
   shuffling the order of encrypted output addresses in the set;
   sending the set to a next node;
   receiving a further shuffled set of addresses from another of the participating nodes, the further shuffled set of addresses including the encrypted first output address;
   replacing the encrypted first output address in the further shuffled set of addresses with the first output address; and
   forwarding the further shuffled set of addresses containing the first output address to a subsequent node.

2. The method claimed in claim 1, wherein replacing the encrypted first output address in the further shuffled set of addresses with the first output address comprises:
   encrypting the first output address with an originator's public key to obtain a final encrypted first output address, the originator's public key being associated with an originator node; and
   replacing the encrypted first output address with the final encrypted first output address.

3. The method claimed in claim 1, wherein adding the encrypted first output address further comprises first receiving an encrypted set from a prior participating node and decrypting the encrypted set to obtain the set of encrypted output addresses.

4. The method claimed in claim 3, wherein sending the set to a next node comprises encrypting the set using a second public key associated with the next node.

5. The method claimed in claim 4, wherein encrypting the set using the second public key excludes encrypting the set with further public keys associated with other participating nodes.

6. The method claimed in claim 1, wherein sending the set to a next node comprises determining that the one of the plurality of participating nodes is not a last node in a first sequence of the participating nodes, and sending the set to the next node in the first sequence.

7. The method claimed in claim 1, wherein sending the set to a next node comprises determining that the one of the plurality of participating nodes is a last node in a first sequence of the plurality of participating nodes, and sending the set to a first node in the first sequence, and wherein the first node is an originator of the communication.

8. The method claimed in claim 1, wherein forwarding the further shuffled set of addresses to the subsequent node comprises determining that the one of the plurality of participating nodes is not a final node in a second sequence of the plurality of participating nodes, and sending the set to the subsequent node in the second sequence.

9. The method claimed in claim 1, wherein forwarding the further shuffled set of addresses to the subsequent node comprises determining that the one of the plurality of participating nodes is a final node in a second sequence of the plurality of participating nodes, and sending the set to a first node in the second sequence, and wherein the first node is an originator of the communication, and wherein the further shuffled set contains all output addresses for the communication.

10. The method claimed in claim 1, wherein shuffling the order includes randomizing the order of the encrypted output addresses in the set.

11. The method claimed in claim 1, further comprising first sending a request to participate in the communication, the request including the first public key.

12. The method claimed in claim 1, wherein the communication includes a blockchain transaction, and wherein each of the respective output addresses comprises an unspent transaction output address owned by its associated participating node.

13. The method claimed in claim 1, wherein the communication is structured to receive an equal quantity of tokens from a respective input address associated with each participating node and to allocate the same equal quantity of tokens to each of the respective output addresses.

14. The method claimed in claim 1, further comprising a subsequent operation of approving the communication by signing an input address included in the communication and associated with said one of the plurality of participating nodes.

15. A computing device for fault-resistant multi-node communication among a plurality of participating nodes, the computing device being one of the plurality of participating nodes, the computer device comprising:
- a processor;
- memory;
- a network interface to provide network connectivity; and
- an application containing computer-executable instructions that, when executed by the processor, cause the processor to carry out the method claimed in claim 1.

16. A non-transitory processor-readable medium storing processor-executable instructions for fault-resistant multi-node communication among a plurality of participating nodes, wherein the processor-executable instructions, when executed by a processor in one of the plurality of participating nodes, cause the processor to carry out the method claimed in claim 1.

* * * * *